(12) United States Patent
Xiao et al.

(10) Patent No.: US 11,172,537 B2
(45) Date of Patent: Nov. 9, 2021

(54) WIRELESS COMMUNICATION METHOD AND DEVICE

(71) Applicants: SHARP KABUSHIKI KAISHA, Sakai (JP); FG INNOVATION COMPANY LIMITED, Tuen Mun (HK)

(72) Inventors: Fangying Xiao, Shanghai (CN); Renmao Liu, Shanghai (CN)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 63 days.

(21) Appl. No.: 16/621,076

(22) PCT Filed: Jun. 8, 2018

(86) PCT No.: PCT/CN2018/090393
§ 371 (c)(1),
(2) Date: Dec. 10, 2019

(87) PCT Pub. No.: WO2018/228283
PCT Pub. Date: Dec. 20, 2018

(65) Prior Publication Data
US 2020/0170072 A1    May 28, 2020

(30) Foreign Application Priority Data

Jun. 15, 2017 (CN) .......................... 201710455174.0

(51) Int. Cl.
*H04W 80/08* (2009.01)
*H04L 5/00* (2006.01)
(Continued)

(52) U.S. Cl.
CPC ............. *H04W 80/08* (2013.01); *H04L 5/001* (2013.01); *H04L 5/0053* (2013.01);
(Continued)

(58) Field of Classification Search
CPC ... H04W 80/08; H04W 64/003; H04W 80/02; H04L 5/001; H04L 5/0053; H04L 5/0076; H04L 5/0098; H04L 69/324
(Continued)

(56) References Cited

U.S. PATENT DOCUMENTS

2018/0279262 A1*  9/2018  Babaei ................. H04W 72/04
2018/0332501 A1* 11/2018  Tseng ...................... H04L 1/189
2020/0007281 A1*  1/2020  Kilinc ....................... H04L 5/001

FOREIGN PATENT DOCUMENTS

CN          104272796 A       1/2015
CN          104935413 A       9/2015
(Continued)

OTHER PUBLICATIONS

NTT DOCOMO,"New SID Proposal: Study on New Radio Access Technology", 3GPP TSG RAN Meeting #71; RP-160671; Göteborg, Sweden, 7.-10. Mar. 2016.
(Continued)

*Primary Examiner* — Obaidul Huq
(74) *Attorney, Agent, or Firm* — ScienBiziP, P.C.

(57) ABSTRACT

The present disclosure provides a method performed by user equipment (UE), comprising receiving a configuration message, from a base station, the configuration message comprising information of two or more cell groups configured for a Packet Data Convergence Protocol (PDCP) packet duplication function. The method further comprises determining, according to a state of each cell in the two or more cell groups, whether conditions required for activation of the PDCP packet duplication function are satisfied. The method further comprises activation of the PDCP packet duplication function when the required conditions are satisfied. In addition, the present disclosure further provides a method per-
(Continued)

formed by a base station and corresponding user equipment and a corresponding base station.

4 Claims, 11 Drawing Sheets

(51) Int. Cl.
H04L 29/08 (2006.01)
H04W 64/00 (2009.01)
H04W 80/02 (2009.01)

(52) U.S. Cl.
CPC .......... *H04L 5/0076* (2013.01); *H04L 5/0098* (2013.01); *H04L 69/324* (2013.01); *H04W 64/003* (2013.01); *H04W 80/02* (2013.01)

(58) Field of Classification Search
USPC ........................................ 370/310, 328, 329
See application file for complete search history.

(56) References Cited

FOREIGN PATENT DOCUMENTS

CN 106134099 A 11/2016
WO 2013140138 A1 9/2013

OTHER PUBLICATIONS

NEC,"Activation and Deactivation of UL PDCP duplication", 3GPP TSG-RAN WG2 #98; R2-1705266; Hangzhou, China, May 15-19, 2017.
Sharp,"Enable/Disable PDCP Duplication", 3GPP TSG-RAN2 Meeting #98; R2-1704941; Hangzhou, China, May 15-19, 2017.

* cited by examiner

WIRELESS COMMUNICATION METHOD AND DEVICE

TECHNICAL FIELD

The present disclosure relates to the wireless communications technologies field. More specifically, the present disclosure relates to a method for implementing a Packet Data Convergence Protocol (PDCP) duplication function and a corresponding device.

BACKGROUND

A new research project on 5G technical standards (see non-patent literature: RP-160671: New SID Proposal: Study on New Radio Access Technology) was proposed in the 3rd Generation Partnership Project (3GPP) RAN plenary meeting #71 held in March 2016, and was approved. The goal of the research project is to develop a New Radio (NR) access technology to meet all of the application scenarios, requirements, and deployment environments of 5G. NR mainly has three application scenarios: enhanced mobile broadband communications (Enhanced mobile broadband: eMBB), massive machine-type communications (massive Machine type communication: mMTC), and ultra-reliable and low latency communications (URLLC).

In the 3GPP RAN2 #96 meeting held in October 2016, it was agreed that research will be performed on multi-connection (including dual-connection) so as to meet the reliability requirement of the URLLC. The multi-connection may adopt mechanisms such as packet duplication or link selection. In the 3GPP NR AdHoc meeting held in January 2017, it was agreed that an NR-PDCP entity supports a packet duplication function of a user plane and a data plane, where the function of a transmitting PDCP entity is to support packet duplication, while the function of a receiving PDCP entity is to support packet de-duplication.

In the 3GPP RAN2 #97 meeting held in February 2017, it was agreed that both uplink and downlink support the following: in carrier aggregation, packet duplication uses Packet Data Convergence Protocol (PDCP) protocol data units (PDUs) and/or service data units (SDUs) for transmission on a plurality of logical channels and causes duplicate PDCP PDUs to be transmitted through different carriers. In the 3GPP RAN2 #98 meeting held in April 2017, it was agreed that in radio resource control (RRC) configuration, two duplicate logical channels are mapped to different carriers, that is, duplicate logical channels cannot be mapped to the same carrier. It was also agreed in this meeting that uplink PDCP duplication is controlled using a MAC control element.

SUMMARY

However, it is hoped that the problems of activation/deactivation of a PDCP packet duplication function of a packet duplication bearer and activation/deactivation of a carrier (cell) in multi-connection scenarios and carrier aggregation scenarios supporting packet duplication will be solved.

According to one aspect of the present disclosure, a method performed by user equipment (UE) is provided, comprising: receiving a configuration message, from a base station, the configuration message comprising information of two or more cell groups configured for a Packet Data Convergence Protocol (PDCP) packet duplication function; determining, according to a state of each cell in the two or more cell groups, whether conditions required for activation of the PDCP packet duplication function are satisfied; and if the required conditions are satisfied, then activating the PDCP packet duplication function.

In one embodiment, the determining whether conditions required for implementing the PDCP packet duplication function are satisfied comprises: if one cell group comprises a primary cell, and at least one activated cell exists in another cell group, then determining that the conditions required for activation of the PDCP packet duplication function are satisfied; or if none of the cell groups comprises a primary cell, when at least one activated cell exists in each of the at least two cell groups, then determining that the conditions required for activation of the PDCP packet duplication function are satisfied.

In one embodiment, the activating the PDCP packet duplication function comprises: receiving from the base station a medium access control (MAC) control message for activating a cell in a cell group, and activating the PDCP packet duplication function in response to the message.

In one embodiment, the method further comprises: if all cells in a cell group not comprising a primary cell are deactivated, then deactivation the PDCP packet duplication function.

In one embodiment, the deactivation the PDCP packet duplication function comprises: receiving from the base station a medium access control (MAC) control message for deactivating a cell in a cell group, and deactivation the PDCP packet duplication function in response to the message.

According to another aspect of the present disclosure, a method performed by a base station is provided, comprising: transmitting a configuration message to user equipment (UE), the configuration message comprising information of two or more cell groups configured for a Packet Data Convergence Protocol (PDCP) packet duplication function; determining, according to a state of each cell in the two or more cell groups, whether conditions required for activation of the PDCP packet duplication function are satisfied; and if the required conditions are satisfied, then transmitting to the UE an instruction for activating the PDCP packet duplication function.

In one embodiment, the determining whether conditions required for activation of the PDCP packet duplication function are satisfied comprises: if one cell group comprises a primary cell, and at least one activated cell exists in another cell group, then determining that the conditions required for activation of the PDCP packet duplication function are satisfied; or if none of the cell groups comprises a primary cell, when at least one activated cell exists in each of the at least two cell groups, then determining that the conditions required for activation of the PDCP packet duplication function are satisfied.

In one embodiment, the method further comprises: transmitting to the UE a medium access control (MAC) control message for deactivating a cell in a cell group.

According to another aspect of the present disclosure, user equipment (UE) is provided, comprising a processor and a memory. The memory stores instructions, the instructions, when run by the processor, perform the method performed by UE described according to the present disclosure.

According to another aspect of the present disclosure, a base station is provided, comprising a processor and a memory, the memory stores instructions, the instructions, when run by the processor, perform the method performed by a base station described according to the present disclosure.

BRIEF DESCRIPTION OF THE DRAWINGS

The above and other features of the present disclosure will become more apparent with the following detailed description in conjunction with the accompanying drawings.

DETAILED DESCRIPTION

Figure 1A:
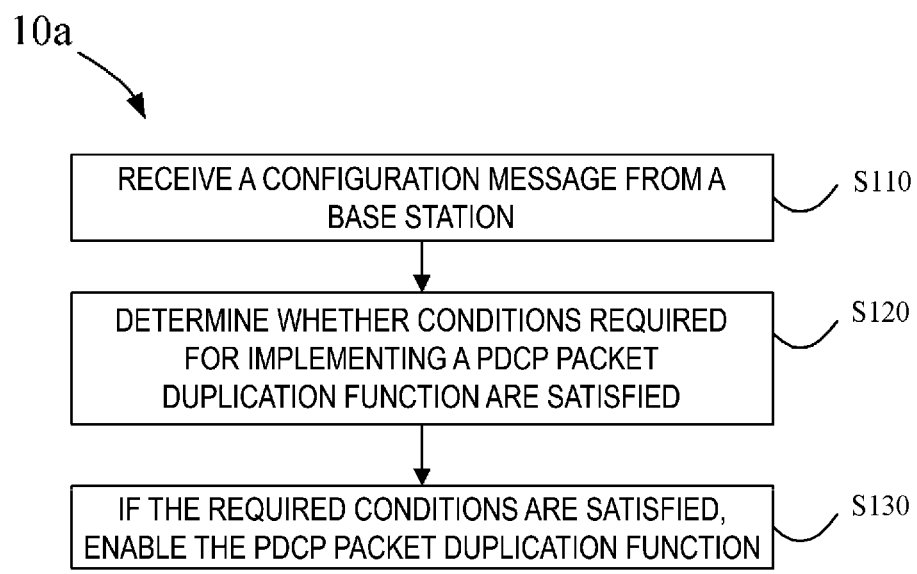
FIG. 1A is a flowchart of a method performed by user equipment according to an embodiment of the present disclosure.

The following describes the present disclosure in detail with reference to the accompanying drawings and specific embodiments. Note that the present disclosure should not be limited to the specific embodiments described below. In addition, for simplicity, detailed description of the known art not directly related to the present disclosure is omitted to prevent confusion in understanding the present disclosure.

Some terms involved in the present disclosure are described below. If not specifically indicated, the terms involved in the present disclosure use the definitions herein. The terms given in the present disclosure may be named differently in NR, LTE, and eLTE, but unified terms are used in the present disclosure. When applied to a specific system, the terms may be replaced with terms used in the corresponding system.

PDCP: Packet Data Convergence Protocol. In the present disclosure, if not specifically indicated, the PDCP may represent a PDCP of NR or LTE or eLTE.

RLC: Radio Link Control. In the present disclosure, if not specifically indicated, the RLC may represent RLC of NR or LTE or eLTE.

MAC: Medium Access Control. In the present disclosure, if not specifically indicated, the MAC may represent MAC of NR or LTE or eLTE.

DTCH: Dedicated Traffic Channel.

CCCH: Common Control Channel.

DCCH: Dedicated Control Channel.

PDU: Protocol Data. Unit.

SDU: Service Data Unit. In the present disclosure, data received from or transmitted to an upper layer is referred to as an SDU, and data transmitted to or received from a lower layer is referred to as a PDU. For example, data received from or transmitted to an upper layer by a PDCP entity is referred to as a PDCP SDU; data received from or transmitted to an RLC entity by the PDCP entity is referred to as a PDCP PDU (namely, an RLC SDU).

Master Base Station: Master eNB, denoted as MeNB (a base station corresponding to E-UTRAN or LTE or eLTE) or MgNB (a base station corresponding to 5G-RAN or NR). The master base station is a base station that at least terminates at a mobility management entity (denoted as S1-MME) as a control node for processing interaction between UE and a core network in multi-connection. In the present disclosure, master base stations are all denoted as MeNBs. It should be noted that all schemes or definitions applicable to the MeNB are also applicable to the MgNB.

Secondary Base Station: Secondary eNB, denoted as SeNB (a base station corresponding to E-UTRAN or LTE or eLTE) or SgNB (a base station corresponding to 5G-RAN or NR). The secondary base station is a base station that provides additional radio resources to LIE but does not serve as an MeNB in multi-connection. In the present disclosure, secondary base stations are all denoted as SeNBs. Note that all schemes or definitions applicable to the SeNB are also applicable to the SgNB.

Primary Cell: Primary Cell (PCell). The PCell is a cell that operates at a primary frequency, on which UE performs an initial connection establishment process or initiates a connection reestablishment process or which is designated as a primary cell during a handover process.

Primary Secondary Cell: Primary Secondary Cell (PS-Cell). The PSCell is an SCG cell used to instruct UE to perform random access during an SCG switching process. In the present disclosure, the SpCell in embodiments of the present invention is a PCell in a carrier aggregation scenario; the SpCell in the embodiments of the present invention may be a PCell or a PSCell in dual-connection.

Secondary Cell: Secondary Cell (SCell). The SCell is a cell that operates at a secondary frequency. The cell can be configured after an RRC connection is established and can be used to provide additional radio resources.

Cell Group: Cell Group (CG). The CG is a group of serving cells or carriers associated with a master base station or a secondary base station. The cell group is a group of cells or carriers associated with a logical channel of a packet duplication bearer or a group of cells providing radio resources or data transmission services to a certain logical channel of a packet duplication bearer in carrier aggregation. The cell may be a cell configured with an uplink carrier. The cell may also be referred to as a serving cell. Note that the cell in the present disclosure may also be referred to as a set of beams.

Master Cell Group: Master Cell Group (MCG). For UE not configured with multi-connection, the MCG consists of all serving cells; for UE configured with multi-connection, the MCG consists of a subset of serving cells (namely, a group of serving cells associated with an MeNB or MgNB) including a PCell and 0, 1, or a plurality of SCells.

Secondary Cell Group: Secondary Cell Group (SCG). The SCG is a group of serving cells associated with an SeNB or an SgNB in multi-connection. The SCG may include one PSCell and may further include one or a plurality of SCells.

Multi-Connection: an operation mode of UE in an RRC connected state. In the multi-connection, a plurality of cell groups is configured, and the plurality of cell groups include one MCG and one or a plurality of SCGs (that is, the UE is connected to a plurality of base stations). If only one MCG (or MeNB or MgNB) and one SCG (or SeNB or SgNB) are configured, then the multi-connection is referred to as dual-connection, That is, the UE in the connected state and having a plurality of receivers and/or transmitters is configured to use EUTRAN and/or 5G-RAN radio resources provided by a plurality of different schedulers; the schedulers may be connected by non-ideal backhaul or ideal backhaul. The multi-connection in the present disclosure includes dual-connection. A multi-connection data transmission mode includes, but is not limited to, data duplication and link selection.

DRB: Data Radio Bearer carrying user plane data, also referred to as a data bearer for short.

SRB: Signaling Radio Bearer. The bearer may be used for transmitting an RRC message and a NAS message or for transmitting only an RRC message and a NAS message. The SRB may include SRB0, SRB1, SRB1bis, and SRB2. SRB0 is used for an RRC message using a CCCH logical channel; SRB1 is used for an RRC message using a DCCH logical channel, where the RRC message may include a NAS message; SRB1 is further used for transmitting a NAS message before SRB2 is established. SRB1bis is used for an RRC message and a NAS message using a DCCH logical channel prior to secure activation, where the RRC message may include a NAS message. SRB2 is used for an RRC message and a NAS message using a DCCH logical channel, where the RRC message includes recorded measurement information (or referred to as a measurement log).

The bearer mentioned in the present disclosure includes a DRB and an SRB.

Split DRB: a bearer of which a wireless protocol is located in an MeNB (or MgNB) and an SeNB (or SgNB) and which uses resources of both the MeNB (or MgNB) and the SeNB (or SgNB) in multi-connection. If a PDCP entity of the split DRB is located in a master base station (that is, data arrives at the master base station first and is forwarded by the master base station to a secondary base station to split the data in the master base station), then the split DRB is referred to as an MCG split DRB; if a PDCP entity of the split DRB is located in a secondary base station (that is, data arrives at the secondary base station first and is forwarded by the secondary base station to a master base station to split the data in the secondary base station), then the split DRB is referred to as an SCG split DRB. If not specifically indicated, the split DRB in the present disclosure may be an MCG split DRB or an SCG split DRB. The embodiments of the present disclosure are also applicable to scenarios where an MCG split DRB and an SCG split DRB are not distinguished, namely, a bearer DRB in which a wireless protocol of the split DRB is located in an MeNB (or MgNB) and an SeNB (or SgNB) and which uses resources of both the MeNB (or MgNB) and the SeNB (or SgNB).

Split SRB: a bearer of which a wireless protocol is located in an MeNB (or MgNB) and an SeNB (or SgNB) and which uses resources of both the MeNB (or MgNB) and the SeNB (or SgNB) in multi-connection. If a PDCP entity and/or RRC of the split SRB is located in a master base station (that is, signaling, also referred to as data, is forwarded by the master base station to a secondary base station to split the signaling in the master base station), then the split SRB is referred to as an MCG split SRB; if a PDCP entity and/or RRC of the split SRB is located in a secondary base station (that is, signaling, also referred to as data, forwarded by the secondary base station to a master base station to split the signaling in the secondary base station), then the split SRB is referred to as an SCG split SRB. If not specifically indicated, the split SRB in the present disclosure may be an MCG split SRB or an SCG split SRB. The embodiments of the present disclosure are also applicable to scenarios where an MCG split SRB and an SCG split SRB are not distinguished, namely, a bearer SRB in which a wireless protocol of the split SRB is located in an MeNB (or MgNB) and an SeNB (or SgNB) and which uses resources of both the MeNB (or MgNB) and the SeNB (or SgNB).

In the present disclosure, the split bearer may be a split SRB or a split DRB. An MCG split bearer may be an MCG split SRB or an MCG split DRB. An SCG split bearer may be an SCG split SRB or an SCG split DRB.

Packet Duplication: also referred to as data duplication, packet duplication, PDCP duplication, or PDCP PDU duplication (if not specifically indicated, the data in the present disclosure may be control plane signaling or user plane data respectively corresponding to signaling of an SRB and data of a DRB). In a multi-connection mode, the same data (or referred to as a packet, namely, a PDCP PDU or a PDCP SDU) is transmitted in serving cells of a plurality of CGs; that is, the same data is transmitted by using resources provided by both a master base station (or an MCG) and a secondary base station (or an SCG); or the same data is transmitted respectively to lower layers (or RLC layers) located at the MCG and the SCG; or a PDCP entity transmits the same PDCP PDU to a plurality of associated lower-layer entities (or RLC entities); or the same data is transmitted on a plurality of different bearers. In a carrier aggregation or single-connection mode, a PDCP entity transmits duplicate (or the same) PDCP Palls to two or a plurality of RLC entities (or referred to as lower-layer entities) and/or logical channels, and a MAC entity transmits the PDCP PDUs to a receiving side through different carriers (namely, cells or serving cells); a receiving PDCP entity is responsible for monitoring and de-duplication of the PDCP PDUs or SDUs.

Packet Duplication Bearer: a bearer supporting packet duplication in a carrier aggregation or single-connection mode, can be a packet duplication SRB or a packet duplication DRB. One PDCP entity of the bearer is associated with two or a plurality of RLC entities, two or a plurality of logical channels, and one MAC entity; a transmitting PDCP entity transmits duplicate (or the same) PDCP PDUs to the two or plurality of RLC entities (or lower-layer entities) and/or the two or plurality of logical channels, and the MAC entity transmits the PDCP PDUs to a receiving side through different carriers (namely, cells or serving cells); a receiving PDCP entity discard the duplicate PDCP PDUs or SDUs from the lower-layer entities.

Packet Duplication Split Bearer: a split bearer supporting packet duplication in a multi-connection mode. In the transmission mode, the same data is transmitted over a plurality of wireless protocols of the split bearer, including an MCG packet duplication split SRB, an SCG packet duplication split SRB, an MCG packet duplication split DRB, and an SCG packet duplication split DRB. If the packet duplication split hearer is an MCG packet duplication split bearer, then a PDCP entity located in a master base station or an MCG is responsible for packet duplication and/or packet de-duplication; if the packet duplication split bearer is an SCG packet duplication split bearer, then a PDCP entity located in a secondary base station or an SCG is responsible for packet duplication (namely, transmission of PDCP PDUs to two or a plurality of RLC entities) and/or packet de-duplication.

Note that, if not specifically indicated, the packet duplication bearer described in the embodiments of the present disclosure can be a packet duplication bearer or a packet duplication split bearer.

Figure 3A:
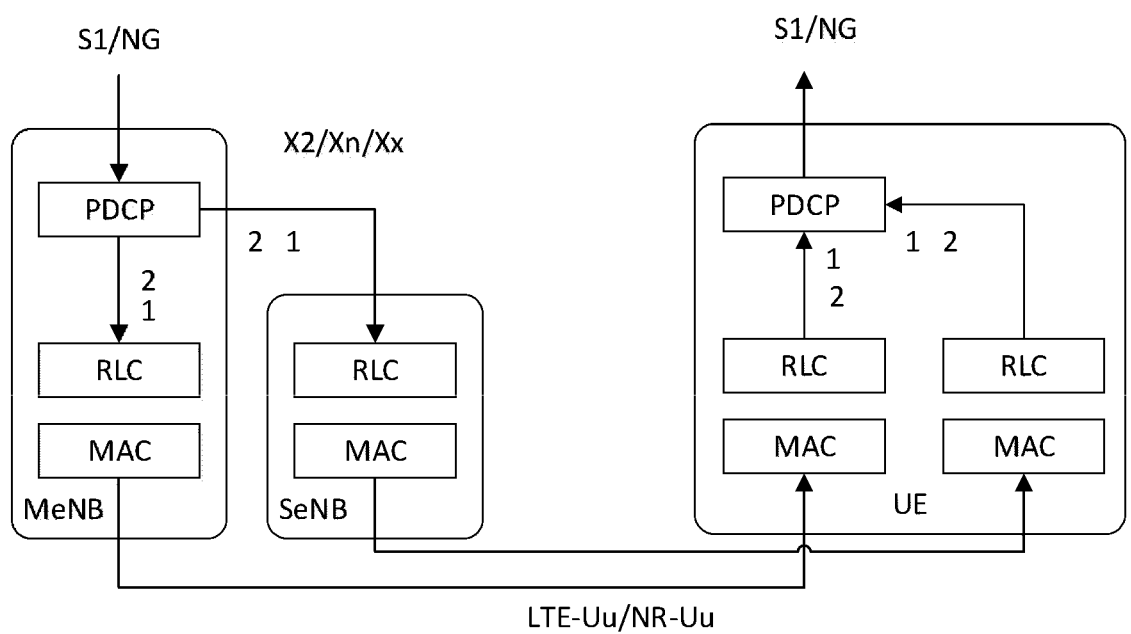
FIG. 3A is a schematic diagram illustrating data transmission of an MCG packet duplication split DRB according to an embodiment of the present disclosure.

FIG. 3A is a schematic diagram illustrating downlink transmission of an MCG packet duplication split DRB between a base station and user equipment (UE) in dual-connection it should be understood that uplink transmission of the MCG packet duplication split DRB between the base station and the UE can adopt the same protocol architecture, except that data is transmitted from the UE to the base station, that is, the arrows in FIG. 3A are reversed.

As shown in FIG. 3A, data (for example, a Packet Data Convergence Protocol protocol data unit (PDCP PDU)) is transmitted over a plurality of wireless protocols (corresponding to a plurality of RLC entities associated with the same PDCP entity) of a split DRB by using resources of an MeNB and an SeNB. In a PDCP PDU data duplication multi-connection mode, each PDCP PDU is transmitted to a receiving party via a plurality of RLC entities. An interface between the MeNB and the SeNB may be denoted as Xn, Xx, or X2. The interface may be named differently according to different types of the MeNB and the SeNB. For example, the interface is denoted as Xx if the MeNB is an LTE eNB and the SeNB is a gNB; the interface is denoted as Xn if the MeNB is a gNB and the SeNB is an eLTE eNB. Accordingly, the MCG packet duplication split SRB adopts a similar protocol architecture. The difference lies in that an upper-layer entity transmitting data to a PDCP entity is RRC, and the PDCP entity receives data from a lower-layer entity and then transmits it to the RRC entity at the upper layer.

Figure 3B:
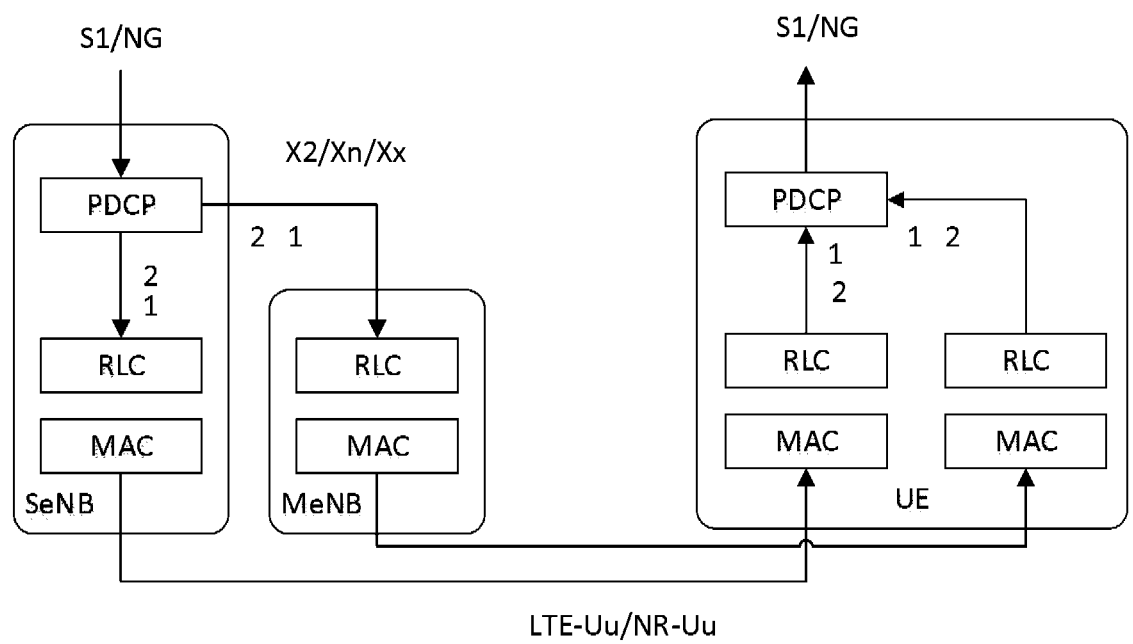
FIG. 3B is a schematic diagram illustrating data transmission of an SCG packet duplication split DRB according to an embodiment of the present disclosure.

FIG. 3B is a schematic diagram illustrating downlink transmission of an SCG packet duplication split DRB between a base station and user equipment (UE) in dual-connection. It should be understood that uplink transmission of the SCG packet duplication split DRB between the base station and the UE can adopt the same protocol architecture, except that data is transmitted from the UE to the base station, that is, the arrows in FIG. 3B are reversed.

As shown in FIG. 3B, data (for example, a Packet Data Convergence Protocol protocol data unit (PDCP PDU)) is transmitted over a plurality of wireless protocols (corresponding to a plurality of RLC entities associated with the same PDCP entity) of a split DRB by using resources of an MeNB and an SeNB. In a PDCP PDU data duplication multi-connection mode, each PDCP PDU is transmitted to a receiving party via a plurality of RLC entities. An interface between the MeNB and the SeNB may be denoted as Xn, Xx, or X2. The interface may be named differently according to different types of the MeNB and the SeNB. For example, the interface is denoted as Xx if the MeNB is an LTE eNB and the SeNB is a gNB; the interface is denoted as Xn if the MeNB is a gNB and the SeNB is an eLTE eNB. Accordingly, the SCG packet duplication split SRB adopts a similar protocol architecture. The difference lies in that an upper-layer entity transmitting data to a PDCP entity is RRC, and the PDCP entity receives data from a lower-layer entity and then transmits it to the RRC entity at the upper layer.

The embodiments of the present disclosure use repeatedly transmitting a data packet PDCP PDU or SDU twice as an example (that is, one PDCP entity is associated with two RLC entities and/or two logical channels). However, the technical solutions in the present disclosure are not limited to the scenario of repeatedly transmitting a data packet PDCP PDU or SDU twice. Those skilled in the art can expand the technical solutions to scenarios where transmission is repeated many times (that is, one PDCP entity is associated with a plurality of RLC entities and/or a plurality of logical channels).

Figure 4A:
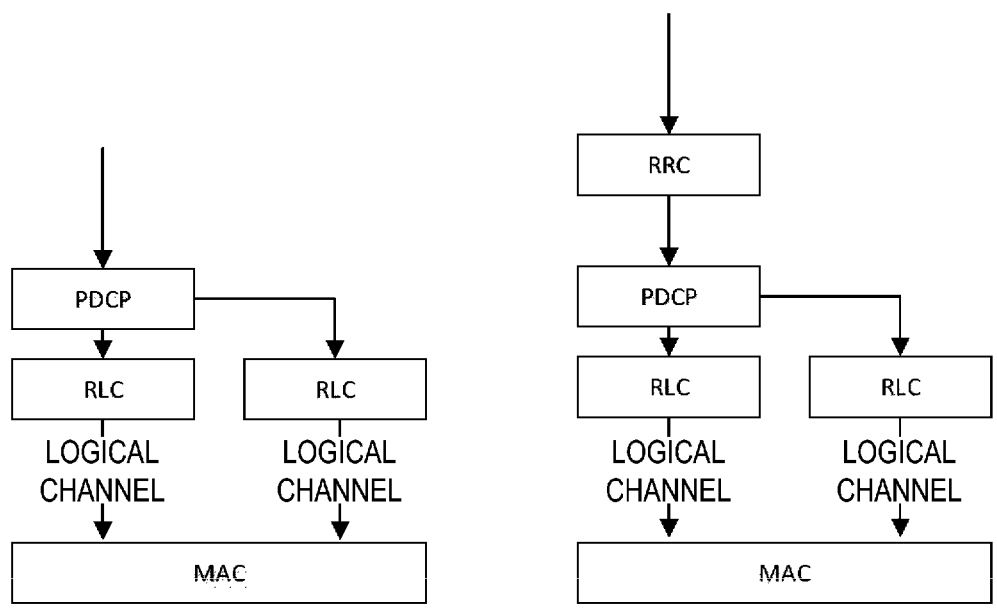
FIG. 4A is a schematic diagram of a protocol architecture of a packet duplication bearer in a carrier aggregation scenario according to an embodiment of the present disclosure.

FIG. 4A is a schematic diagram of a protocol architecture of a packet duplication bearer in a carrier aggregation scenario. In the schematic diagram shown on the left side of FIG. 4A, a PDCP entity of a DRB is associated with two RLC entities, two logical channels, and one MAC entity. In the schematic diagram shown on the right side of FIG. 4A, an RRC entity and a PDCP entity of an SRB are associated with two RLC entities, two logical channels, and one MAC entity.

Figure 4B:
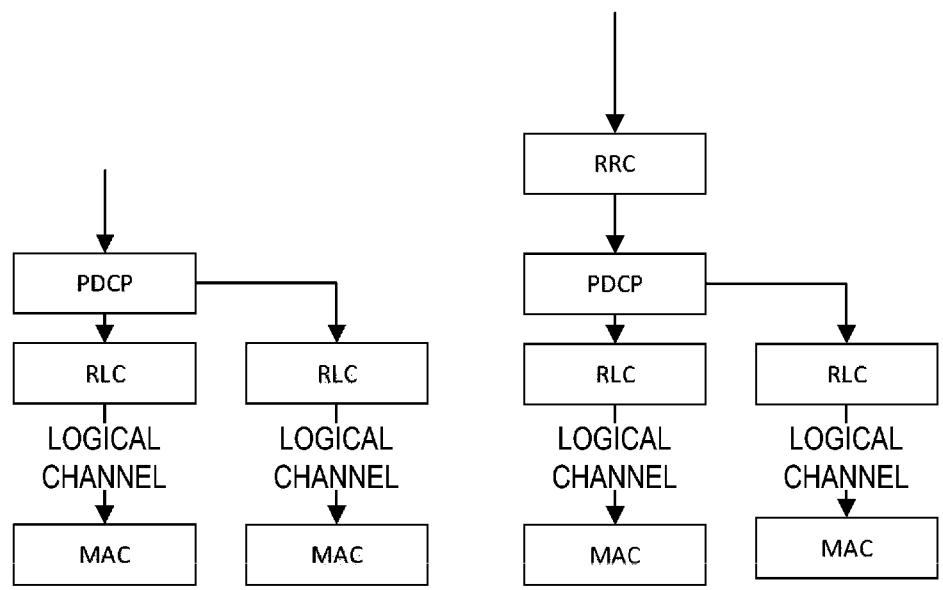
FIG. 4B is a schematic diagram of a protocol architecture of a packet duplication hearer in a dual-connection scenario according to an embodiment of the present disclosure.

FIG. 4B is a schematic diagram of a protocol architecture of a packet duplication bearer in a dual-connection scenario. In the schematic diagram shown on the left side of FIG. 4B, a PDCP entity of a DRB is associated with two RLC entities, two logical channels, and two MAC entities. In the schematic diagram shown on the right side of FIG. 4B, an RRC entity and a PDCP entity of an SRB are associated with two RLC entities, two logical channels, and two MAC entities.

If not specifically indicated, the activating packet duplication (also referred to as PDCP packet duplication, packet duplication of a packet duplication bearer, PDCP PDU duplication, PDCP SDU duplication, PDCP duplication, PDCP duplication of a packet duplication bearer, PDCP PDU duplication of a packet duplication bearer, or PDCP SDU duplication of a packet duplication bearer) in the present disclosure may also be expressed as configuring a PDCP entity to transmit the same PDCP PDU or PDCP SDU to two or a plurality of associated lower-layer entities (or RLC entities and/or logical channels). In the case of a packet duplication split bearer, the packet duplication function is activated so that the same PDCP PDU is transmitted via an MCG and an SCG. The deactivation a packet duplication function may also be expressed as configuring a PDCP entity to transmit the same PDCP PDU to one of two or a plurality of associated lower-layer entities (or RLC entities and/or logical channels); or all PDCP PDUs are transmitted via only one of two or a plurality of lower-layer entities (or RLC entities and/or logical channels). For example, when an instruction to deactivate PDCP packet duplication from an upper layer or a MAC layer or a lower layer is received, a PDCP PDU is transmitted via only an RLC entity associated with a logical channel having a predefined logical channel identity or an RLC entity associated with a logical channel having a smaller, smallest, larger, or largest logical channel identity. In the case of a packet duplication split bearer, the PDCP packet duplication function is deactivated so that a PDCP PDU is transmitted via only an MCG or an SCG; the PDCP packet duplication function is deactivated so that a PDCP PDU is transmitted via only the MCG; or the PDCP packet duplication function is deactivated so that a PDCP PDU is transmitted via only the SCG. In the present disclosure, the packet duplication refers to uplink packet duplication.

FIG. 1A is a flowchart of a method 10a performed by user equipment according to an embodiment of the present disclosure.

Step S110: Receive a configuration message, from a base station, the configuration message including information of two or more cell groups configured for a Packet Data Convergence Protocol (PDCP) packet duplication function.

Step S120: Determine, according to a state of each cell in the two or more cell groups, whether conditions required for activation of the PDCP packet duplication function are satisfied. For example, if one cell group includes a primary cell, and at least one activated cell exists in another cell group, then it is determined that the conditions required for activation of the PDCP packet duplication function are satisfied. Alternatively, if none of the cell groups includes a primary cell, when at least one activated cell exists in each of the at least two cell groups, then it is determined that the conditions required for activation of the PDCP packet duplication function are satisfied.

Step S130: If the required conditions are satisfied, then activate the PDCP packet duplication function. For example, when the conditions required for activation of the PDCP packet duplication function are satisfied, the UE may activate the PDCP packet duplication function by itself. Alternatively, when the conditions required for activation of the PDCP packet duplication function are satisfied, the UE may receive from the base station an instruction for activating the PDCP packet duplication function, and activate the PDCP packet duplication function in response to the instruction.

Alternatively, the UE may receive from the base station a medium access control (MAC) control message for activating a cell in a cell group and activate the PDCP packet duplication function in response to the message.

Alternatively, if all cells in a cell group not including a primary cell are deactivated, the PDCP packet duplication function is deactivated. For example, the UE receives from the base station a medium access control (MAC) control message for deactivating a cell in a cell group, and deactivates the PDCP packet duplication function in response to the message.

Figure 1B:
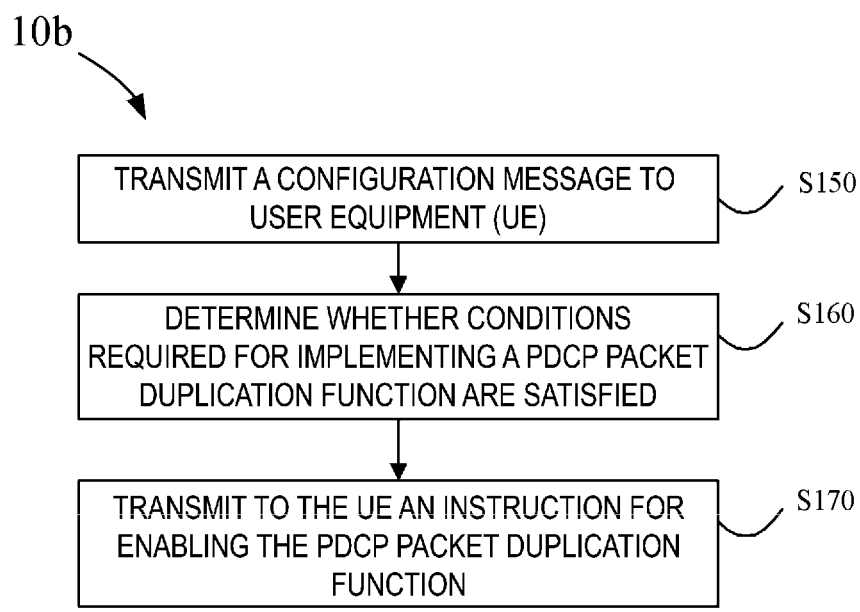
FIG. 1B is a flowchart of a method performed by a base station according to an embodiment of the present disclosure.

FIG. 1B is a flowchart of a method 10b performed by a base station according to an embodiment of the present disclosure.

Step S150: Transmit a configuration message to user equipment (UE), the configuration message including information of two or more cell groups configured for a Packet Data Convergence Protocol (PDCP) packet duplication function.

Step S160: Determine, according to a state of each cell in the two or more cell groups, whether conditions required for activating the PDCP packet duplication function are satisfied. For example, if one cell group includes a primary cell, and at least one activated cell exists in another cell group, then it is determined that the conditions required for activating the PDCP packet duplication function are satisfied. Alternatively, if none of the cell groups includes a primary cell, when at least one activated cell exists in each of the at least two cell groups, then it is determined that the conditions required for activating the PDCP packet duplication function are satisfied.

Step S170: If the required conditions are satisfied, then transmit to the UE an instruction for activating the PDCP packet duplication function.

Alternatively, the base station may further transmit to the user equipment (UE) a medium access control (MAC) control message for deactivating a cell in a cell group, so as to deactivate the PDCP packet duplication function.

Examples of a relationship between activation/deactivation of a packet duplication function and activation/deactivation of carriers (cells) are given below in two cases.

Case I: A Cell Group Configured for a Packet Duplication Bearer Includes a PCell In this case, for any packet duplication bearer, a PCell must be associated with a certain logical channel or RLC entity of the packet duplication bearer.

Figure 5:
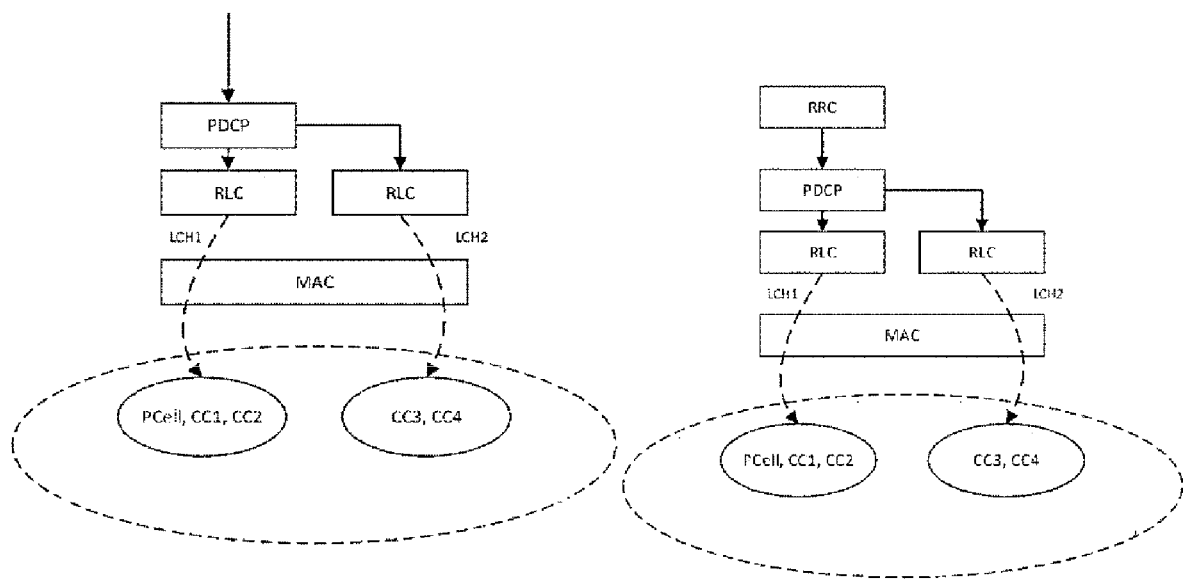
FIG. 5 is a schematic diagram illustrating a cell group configuration of a packet duplication bearer according to an embodiment of the present disclosure.
Figure 6:
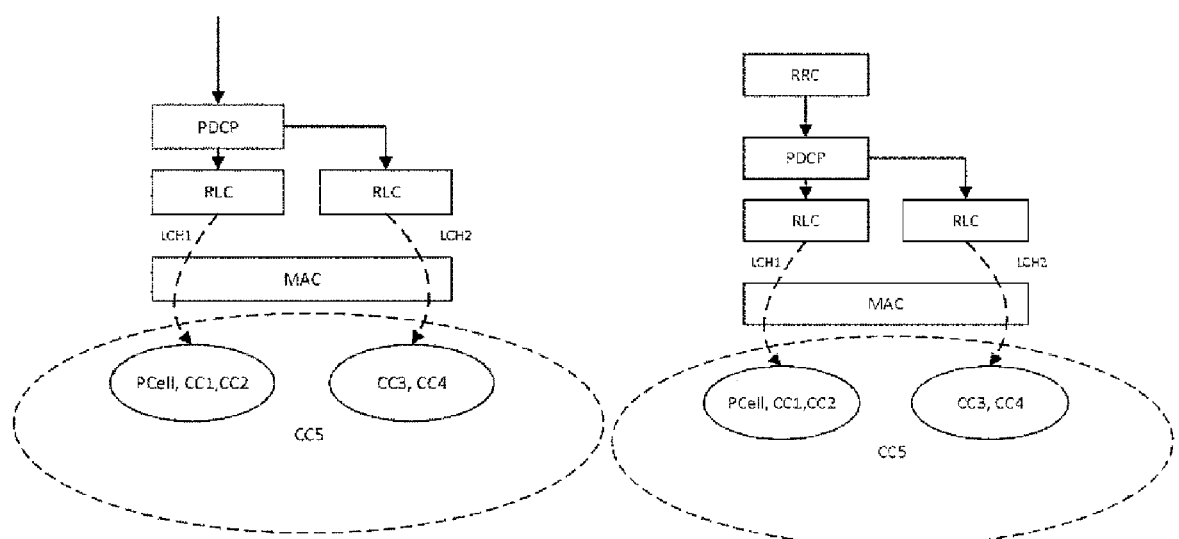
FIG. 6 is a schematic diagram illustrating a cell group configuration of a packet duplication bearer according to an embodiment of the present disclosure.

FIG. 5 and FIG. 6 are schematic diagrams illustrating a cell group configuration of a packet duplication bearer according to an embodiment of the present disclosure. The schematic diagrams on the left side of FIG. 5 and FIG. 6 are related to a data bearer, while the schematic diagrams on the right side of FIG. 5 and FIG. 6 are related to a signaling bearer.

For example, when all cells in a certain cell group associated with a packet duplication bearer are deactivated (for example, UE deactivates all SCells in the cell group when receiving an activation/deactivation medium access control (MAC) control element (CE) for activating/deactivating SCells), a PDCP packet duplication function of the packet duplication bearer is deactivated where the cell group does not include a PCell (that is, the cell group is a cell group not including a PCell). In other words, when all SCells in a cell group not including a PCell are deactivated, a PDCP packet duplication function of a corresponding packet duplication bearer is deactivated (that is, a MAC entity instructs an upper-layer entity to deactivate PDCP packet duplication, where the upper-layer entity may be an RRC entity or a PDCP entity).

Alternatively, when a PDCP packet duplication function of a packet duplication bearer is activated, each cell group associated with the packet duplication bearer has at least one activated cell, or SCells associated with the packet duplication bearer are all activated (applicable in the case where each logical channel of the packet duplication bearer is associated with one cell). If a cell group does not include a PCell, then the cell group has at least one SCell in an activated state. In other words, when a PDCP packet duplication function of a packet duplication bearer is activated, a cell group configured for the packet duplication bearer and not including a PCell has at least one SCell in an activated state.

Alternatively, when the UE receives a MAC control element for activating/deactivating SCells (referred to as an activation/deactivation MAC CE), each cell group associated with a packet duplication bearer of the UE has at least one cell in an activated state, and packet duplication of the packet duplication bearer is activated. For example, two cell groups associated with a packet duplication bearer DRB1 are CG1={PCell, CC1, CC2}, CG2={CC3, CC4}. Initially, CC1 is in an activated state, and CC2, CC3, and CC4 are in a deactivated state; at this time, packet duplication of DRB1 is deactivated. The UE receives an activation/deactivation MAC CE that is used for activating CC3; at this time, the UE will activate the packet duplication function of DRB1.

Case II: A Cell Group Associated with a Packet Duplication Bearer May not Include a PCell In this case, for any packet duplication bearer, a PCell may not be associated with any logical channel or RLC entity of the packet duplication bearer.

Figure 7:
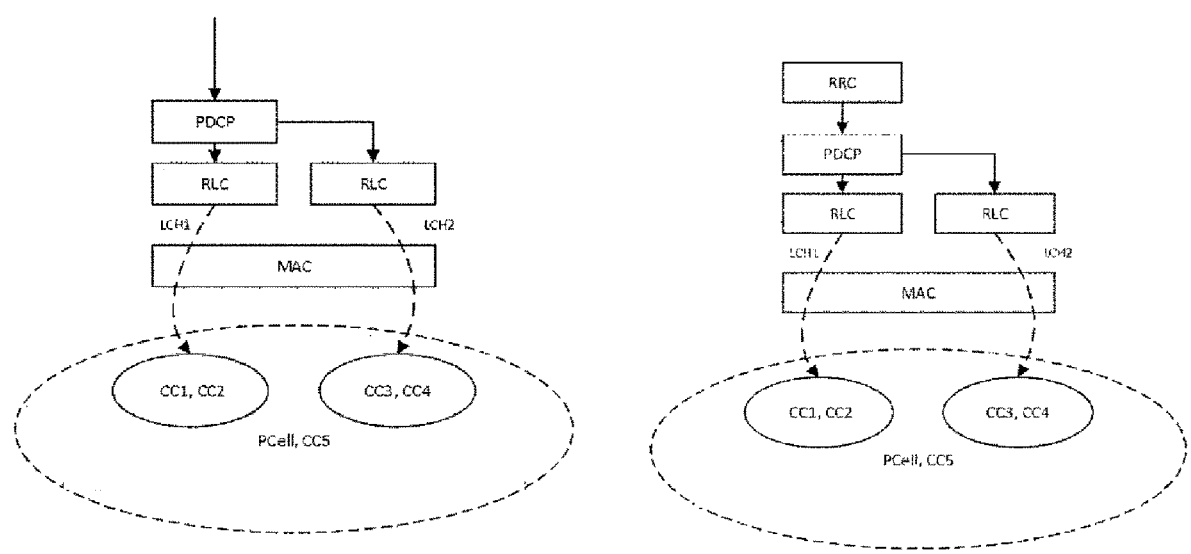
FIG. 7 is a schematic diagram illustrating a cell group configuration of a packet duplication bearer according to an embodiment of the present disclosure.

FIG. 7 is a schematic diagram illustrating cell group configuration of a packet duplication bearer according to an embodiment of the present disclosure. The schematic diagram on the left side of FIG. 7 is related to a data bearer, while the schematic diagram on the right side of FIG. 7 is related to a signaling bearer.

For example, when all cells in a certain cell group associated with a packet duplication bearer are deactivated (for example, UE deactivates all SCells in the cell group when receiving an activation/deactivation medium access control (MAC) control element (CE) for activating/deactivating SCells), a PDCP packet duplication function of the packet duplication bearer is deactivated, where the cell group does not include a PCell (that is, the cell group is a cell group not including a PCell). In other words, when all SCells in a cell group not including a PCell are deactivated, a PDCP packet duplication function of a corresponding packet duplication bearer is deactivated.

Alternatively, when a PDCP packet duplication function of a packet duplication bearer is activated, each cell group associated with the packet duplication bearer has at least one activated cell, or SCells configured for the packet duplication bearer are all activated (applicable in the case where each logical channel of the packet duplication bearer is associated with one cell). If a cell group does not include a PCell, then the cell group has at least one SCell in an activated state. In other words, when a PDCP packet duplication function of a packet duplication bearer is activated, a cell group configured for the packet duplication bearer and not including a PCell has at least one SCell in an activated state.

Alternatively, when an activation/deactivation MAC CE is received, cells in a cell group configured for a packet duplication bearer are all deactivated or are in a deactivated state; the packet duplication bearer is released or suspended, or an error is reported to an upper layer, or it is reported to the upper layer that SCells in the cell group are all deactivated, or a PDCP packet duplication function of the packet duplication bearer is deactivated, and the cell group configured for the packet duplication bearer does not include a PCell; that is, the PCell is not used for transmitting data of the packet duplication bearer, or the PCell is not included in the cell group configured for the packet duplication bearer.

PDCP Packet Duplication Function

Alternatively, when the UE receives a MAC control element for activating/deactivating SCells (referred to as an activation/deactivation MAC CE), each cell group configured for a packet duplication bearer of the UE has at least one cell in an activated state, and packet duplication of the packet duplication bearer is activated. For example, two cell groups of a packet duplication bearer DRB1 are CG1={CC1, CC2}, CG2={CC3, CC4}. Initially, CC1 is in an activated state, and CC2, CC3, and CC4 are in a deactivated state; at this time, packet duplication of DRB1 is deactivated. The LIE receives an activation/deactivation MAC CE that is used for activating CC3; at this time, the UE will activate the packet duplication function of DRB1.

Alternatively, when the packet duplication bearer is initially configured, at least one cell in cells or cell groups associated with the packet duplication bearer is activated. For example, as shown in FIG. 5, since one cell group includes a PCell that is always in an activated state (that is, the PCell cannot be deactivated), the condition that at least one cell in the cells or cell groups is activated is satisfied. If a PDCP packet duplication function is activated after a packet duplication bearer is initially configured, then SCells associated with the packet duplication bearer all need to be in an activated state, or at least one cell in each cell group associated with the packet duplication bearer is activated, or at least one SCell in a cell group associated with the packet duplication bearer and not including a PCell is activated.

Alternatively, when a packet duplication bearer is initially configured, if SCells associated with the packet duplication bearer are all activated (applicable in the case where logical channels are associated with only one cell), or at least one cell in each cell group associated with the packet duplication bearer is activated, or at least one SCell in each cell group associated with the packet duplication bearer and not including a PCell is activated, then the PDCP packet duplication function is activated.

In dual-connection, cells or cell groups configured for a packet duplication split bearer are respectively located in a master base station and a secondary base station; the aforementioned embodiments for a packet duplication bearer are also applicable to a packet duplication split bearer, and the description for a PCell in the corresponding embodiments is changed to that for an SpCell.

Figure 2A:
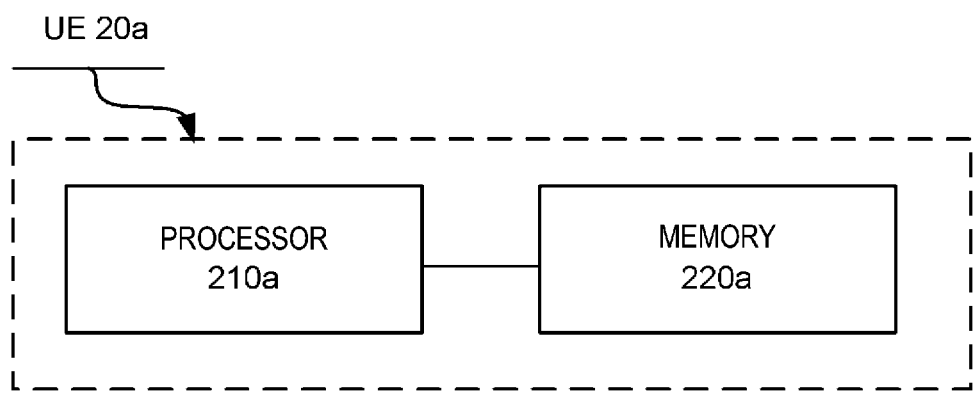
FIG. 2A is a block diagram of user equipment according to an embodiment of the present disclosure.

FIG. 2A is a block diagram of user equipment 20a according to an embodiment of the present disclosure. As shown in FIG. 2A, the user equipment 20a includes a processor 210a and a memory 220a. The processor 210a may, for example, include a microprocessor, a microcontroller, an embedded processor, or the like. The memory 220a may, for example, include a volatile memory (for example, a random access memory (RAM)), a hard disk drive (HDD), a non-volatile memory (for example, a flash memory), or other memories. The memory 220a stores program instructions, the instructions, when run by the processor 210a, can perform the aforementioned method performed by user equipment (for example, the method shown in FIG. 1A) described in detail in the present disclosure.

Figure 2B:
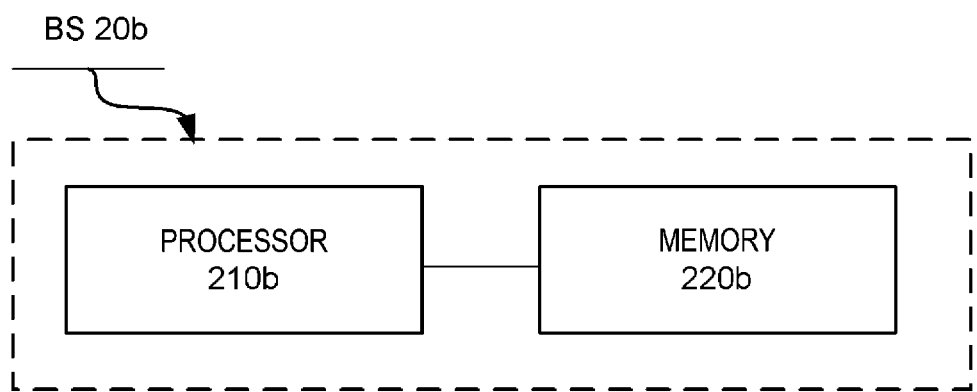
FIG. 2B is a block diagram of a base station according to an embodiment of the present disclosure.

FIG. 2B is a block diagram of a base station 20b according to an embodiment of the present disclosure. As shown in FIG. 2B, the base station 20b includes a processor 210b and a memory 220b. The processor 210b may, for example, include a microprocessor, a microcontroller, an embedded processor, or the like. The memory 220b may, for example, include a volatile memory (for example, a random access memory (RAM)), a hard disk drive (HDD), a non-volatile memory (for example, a flash memory), or other memories. The memory 220b stores program instructions, the instructions, when run by the processor 210b, can perform the aforementioned method performed by a base station (for example, the method shown in FIG. 1B) described in detail in the present disclosure.

Note that cells or cell groups configured for or associated with a packet duplication bearer or a packet duplication split bearer in the embodiments of the present disclosure may also be described as cells or cell groups associated with RLC entities or logical channels of the packet duplication bearer or the packet duplication split bearer.

Note that in the implementation of the present disclosure, scenarios of activation or deactivation PDCP packet duplication include, but are not limited to, reception from a base station of a MAC CE for activation or deactivation packet duplication, and initial configuration of a packet duplication bearer or a packet duplication split bearer (reception from a base station of an RRC reconfiguration message for configuring a packet duplication bearer or a packet duplication split bearer).

Note that in the present disclosure, the cells or cell groups associated with a packet duplication bearer are cells or cell groups associated with RLC entities or logical channels of the packet duplication bearer. The associating logical channels (or RLC entities) with cell groups (or associating cell groups with logical channels or RLC entities) may also be described as cell groups providing services to logical channels, data from logical channels being transmitted via cells or cell groups, or cell groups being configured for a packet duplication hearer. The associating logical channels with cell groups can be replaced with associating RLC entities with cell groups.

The program running on the device according to the present disclosure may be a program that enables a computer to implement the functions of the embodiments of the present disclosure by controlling a central processing unit (CPU). The program or information processed by the program can be temporarily stored in a volatile memory (for example, a random access memory (RAM)), a hard disk drive (HDD), a non-volatile memory (for example, a flash memory), or other memory systems.

The program for implementing the functions of the embodiments of the present disclosure may be recorded on a computer-readable recording medium. The corresponding functions can be achieved by reading programs recorded on the recording medium and executing them by the computer system. The so-called "computer system" herein may be a computer system embedded in the device, which may include operating systems or hardware (for example, peripherals). The "computer-readable recording medium" may be a semiconductor recording medium, an optical recording medium, a magnetic recording medium, a recording medium for dynamically storing programs for a short time, or any other recording medium readable by a computer.

Various features or functional modules of the device used in the above embodiments may be implemented or executed by means of circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the devices above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the embodiments have been described, the present disclosure is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications can be made to the present disclosure within the scope of the claims. Embodiments resulted from the appropriate combinations of the technical means disclosed in different embodiments are also included within the technical scope of the present disclosure. In addition, components with the same effect described in the above embodiments may be replaced with one another.

The invention claimed is:

1. A method performed by user equipment (UE), comprising:
    receiving a configuration message from a base station, the configuration message comprising information of two or more cell groups configured for a Packet Data Convergence Protocol (PDCP) packet duplication function;
    determining, according to whether each of the two or more cell groups includes at least one activated cell, whether a condition required for activation of the PDCP packet duplication function is satisfied, determining whether the condition is satisfied comprising:
        determining that the condition is satisfied after determining that each of the two or more cell groups includes the at least one activated cell; and
        determining that the condition is not satisfied after determining that all cells in at least one cell group of the two or more cell groups that does not include a primary cell are deactivated;
    when the condition is satisfied, activating the PDCP packet duplication function; and
    when the condition is not satisfied, deactivating the PDCP packet duplication function.

2. The method according to claim 1, further comprising:
    releasing a radio bearer associated with the PDCP packet duplication function when the PDCP packet duplication function is deactivated.

3. A User equipment (UE), comprising:
    a processor; and
    a memory, the memory storing instructions, wherein the instructions, when executed by the processor, cause the processor to:
    receive a configuration message from a base station, the configuration message comprising information of two or more cell groups configured for a Packet Data Convergence Protocol (PDCP) packet duplication function;
    determine, according to whether each of the two or more cell groups includes at least one activated cell, whether a condition required for activation of the PDCP packet duplication function is satisfied, determining whether the condition is satisfied comprising:
        determining that the condition is satisfied after determining that each of the two or more cell groups includes the at least one activated cell; and
        determining that the condition is not satisfied after determining that all cells in at least one cell group of the two or more cell groups that does not include a primary cell are deactivated;
    when the condition is satisfied, activating the PDCP packet duplication function; and
    when the condition is not satisfied, deactivating the PDCP packet duplication function.

4. The UE according to claim 3, wherein the instructions, when executed by the processor, further cause the processor to:
    release a radio bearer associated with the PDCP packet duplication function when the PDCP packet duplication function is deactivated.

* * * * *